UNITED STATES PATENT OFFICE.

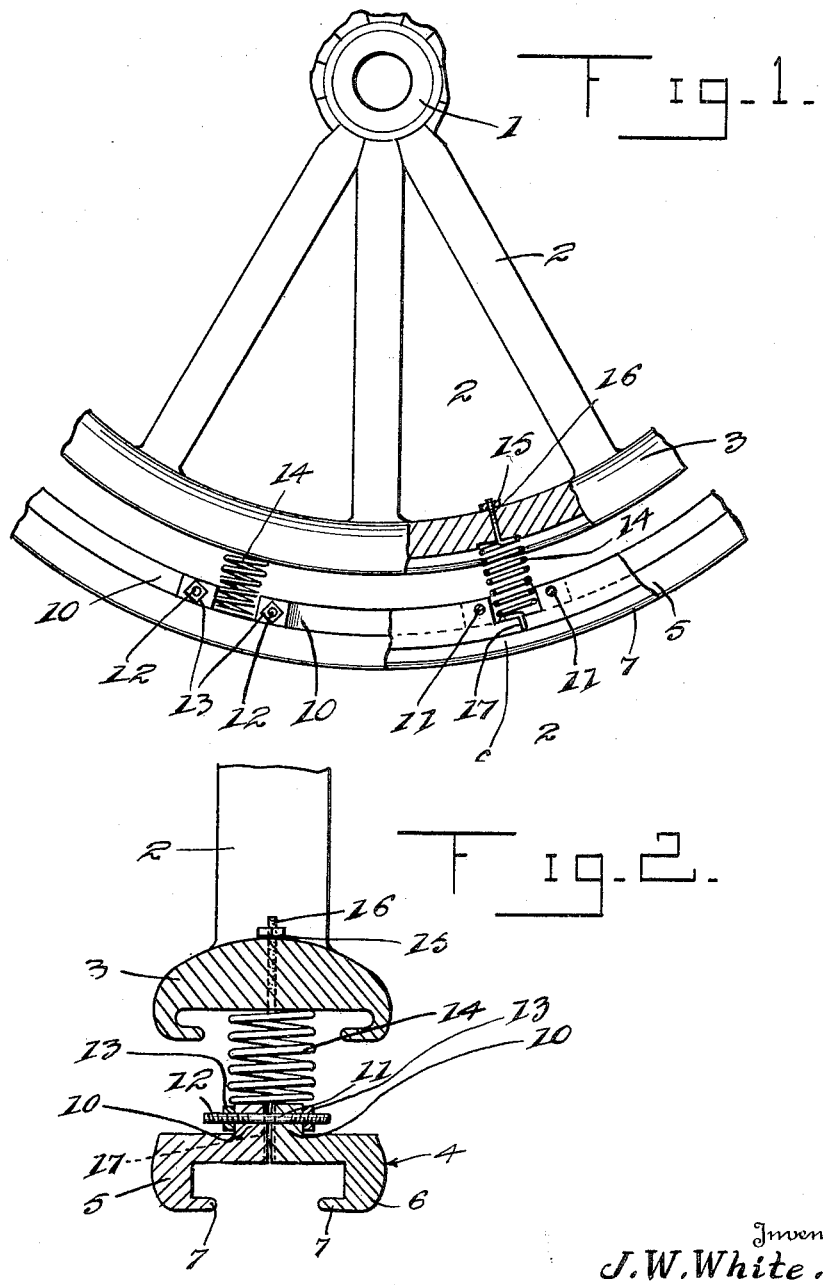

JESSE W. WHITE, OF EDMOND, OKLAHOMA.

VEHICLE-WHEEL ATTACHMENT.

1,115,355.    Specification of Letters Patent.    Patented Oct. 27, 1914.

Application filed April 18, 1914.   Serial No. 832,824.

*To all whom it may concern:*

Be it known that I, JESSE W. WHITE, a citizen of the United States, residing at Edmond, in the county of Oklahoma and State of Oklahoma, have invented certain new and useful Improvements in Vehicle-Wheel Attachments; and I do hereby declare the following to be a full, clear, and exact description of the invention, such as will enable others skilled in the art to which it appertains to make and use the same.

My invention relates to new and useful improvements in vehicle wheel construction and more particularly to an attachment therefor which consists of a spring cushioned rim arranged to secure a cushion tire and to be attached to the rim of a wheel after the removal of the ordinary tire therefrom so that all of the resiliency and advantages of the pneumatic tire are had without the disagreeable features, such as punctures and great expense, that are had in the pneumatic tire.

An important object of the invention is to provide an attachment of the character described which is simple and comparatively cheap to manufacture and adapted to be readily attached to the rims of wheels in a most expeditious manner.

The invention further aims to improve wheels and devices of the character described so as to render them more practical, cheap to manufacture and commercially desirable.

The above and additional objects are accomplished by such means as are illustrated in the accompanying drawings, described in the following specification and then more particularly pointed out in the claim which is appended hereto and forms a part of this application.

With reference to the drawings, wherein I have illustrated the preferred embodiment of my invention as it is reduced to practice, and throughout the several views of which similar reference numerals designate corresponding parts: Figure 1 is a fragmentary view in elevation and partly in section showing my attachment applied to a vehicle wheel, and Fig. 2 is a sectional view taken through Fig. 1 illustrating in detail the construction and arrangement of my improved attachment.

Referring to the drawings the numeral 1 designates the hub of a wheel, having spokes 2 and usual clencher rim 3.

My improved attachment comprises a split rim designated 4 as an entirety and consisting of two annular sections 5 and 6. Each rim section is provided with the usual clamping flange 7 to secure a tire. In this connection it is to be noted that any suitable type of cushion tire may be used in connection with my attachment and it has been found preferable to use solid rubber tires. As a means for clamping the rim sections 5 and 6 of the split rim 4 into operative position there has been provided upon each section a plurality of inwardly extending apertured segmental spaced flanges 10 that are arranged adjacent the inner edges of the sections, the flanges of each section being disposed diametrically opposite engaging each other and having inserted therethrough rods 11 having screw threaded terminals 12. The screw threaded terminals 12 project through the apertured flanges 10 and have suitable nuts 13 turned thereon.

The cushioning means consists of a plurality of helical expansive springs 14 that are arranged in suitable spaced relation to each other between the wheel rim 3 and split rim 4 thus spacing the split and wheel rims. The terminals of the springs 14 are bent to extend from each end of the coils centrally thereof. The inner terminals 15 of the springs are screw threaded and turned through apertures which may be formed in the wheel rim 3, so as to project from the inner face of the wheel rim. Suitable nuts 16 may be mounted upon the extended portions of the inner terminals 15 of the springs. The outer terminals 17 of the springs are disposed between the rim sections 5 and 6 of the split rim 4 and clamped by means of the clamping means described in that position. The outer ends of the springs are disposed in engagement with the inner rim face between the end of the flanges 10. The meeting faces of the rim sections 5 and 6 are preferably provided with grooves whereby the outer terminals 17 of the springs 14 may fit therein, thus insuring the proper clamping action of the springs and alinement of the rim sections relative to each other.

It will be readily seen with reference to the foregoing description and accompanying drawings that the cushion tire not shown, may be securely clamped in a most expeditious manner so that stretching thereof is eliminated.

I am desirous of emphasizing the fact that a person may with great ease attach my device for operation in a most reliable manner for reason of its simplicity of construction.

It has been found preferable to form the split rim 4 of metallic sections to provide strength and durability.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claim.

What is claimed is:—

The combination with a vehicle wheel of an attachment therefor including a rim consisting of two circular sections having flat inner faces and engaging one another on said flat faces, a plurality of segmental flanges carried on the inner faces of the sections and engaging one another, a plurality of springs interposed between the sections and rim of the vehicle wheel, certain ends of the springs being positioned between the sections, screw threaded rods inserted through the flanges and effecting a clamping thereof upon said spring terminals also holding the sections to one another and the other ends of the springs being screw threaded and turned through the wheel rim, and nuts on the extended ends of said screw threaded portions.

In testimony whereof I affix my signature in presence of two witnesses.

J. W. WHITE.

Witnesses:
W. B. BRYANT,
TOLFORD PATTERSON.

Copies of this patent may be obtained for five cents each, by addressing the "Commissioner of Patents, Washington, D. C."